United States Patent [19]

Ellis

[11] 4,408,550

[45] Oct. 11, 1983

[54] TRANSPLANTING IMPLEMENT

[76] Inventor: Wayne S. Ellis, 401 S. Marietta, Verona, Wis. 53593

[21] Appl. No.: 328,202

[22] Filed: Dec. 7, 1981

[51] Int. Cl.³ .............................................. A01L 11/2
[52] U.S. Cl. ...................................................... 111/2
[58] Field of Search ............................. 111/2, 3, 1, 4; 471/1.7; 294/50.9, 104, 99 R, 992

[56] References Cited

U.S. PATENT DOCUMENTS 461,519 10/1891 Bender .................................... 111/3
461,920 10/1891 Mole ...................................... 111/3

Primary Examiner—James R. Feyrer
Assistant Examiner—D. D. DeMille
Attorney, Agent, or Firm—Keith Schoff

[57] ABSTRACT

A seedling transplanting implement is provided with increased versatility by substituting a yieldable rubber-like extremity portion on one of a pair of mechanical transplanting fingers. The yieldable finger portion can ride over the top of a planted seedling without causing injury to the planting and thereby enable seedlings to be planted in a row at spacings of two inches or less as compared to spacings of about fourteen inches necessary with similar implements embodying mechanically rigid planting fingers.

2 Claims, 2 Drawing Figures

4,408,550

TRANSPLANTING IMPLEMENT

BACKGROUND OF THE INVENTION

Numerous agricultural crops are transplanted from seedbed to field acreage when the plants are at seedling stage, that is, when three feet in height or less. Such crops include tobacco, rice, tomatoes, onions, strawberries, and as well, both conifer and deciduous species of forest crops are similarly transplanted from nursery stock. The great range in size and diversity of kind of seedlings which are required to be handled by transplanting implements has resulted in semispecialized machinery having been developed, each type of machine being adapted to handle only a portion of the entire range of seedling transplant sizes. One transplanter implement design which heretofore has been used with larger size seedlings requiring spacing intervals of fourteen inches or more, comprises a pair of metal fingers, one fixedly mounted and another pivotally mounted to open and close with respect to the first, and which radially extend in a vertical plance from a hub driven by linkage connection to ground engaging wheels. The pivotally mounted finger moves under actuation from a cam follower engaging a fixed position cam lobe which is of a configuration to provide momentary hesitation in the travel of the pivotally mounted finger with respect to constant speed rotation of the hub which mounts the fingers. While the pivotally mounted finger appears frozen in position with respect to stationary parts of the machine, the fixedly mounted finger catches up and closes toward it, to appearances, under urging of spring loading, and during this interval a seedling may be mechanically or manually placed between the finger pairs and be retained in such position by the spring loaded clamping action of the fingers while it is conveyed by rotation of the hub to an upright position at desired elevational level in a furrow. At that position the seedling is released from the grip of the fingers by the pivotally mounted separating against spring urging from the fixedly mounted finger by cam actuation. At the same time a pair of pack wheels or equivalent means closes the furrow by piling dirt around the roots of the seedling to complete the transplanting operation. Heretofore, to avoid damaging a seedling, the fixedly mounted finger of a pair carrying a seedling has been required to lift from a furrow without the tip traveling rearwardly over the planted seedling, that is, that the path of travel of the tip define a cusp.

SUMMARY DESCRIPTION OF THE INVENTION

A transplanter implement of the type having pairs of mechanical fingers arranged to extend radially from a rotatable hub and which are cyclically biased to open and close one with respect to the other by means of cam and can follower actuation may be provided with increased versatility for handling seedling transplant stock by providing an extremity portion of one finger of each finger pair as a yieldable rubber-like prong which may conveniently be tubular hose of differing suppleness for kinds and sizes of seedlings, as may be required. The suppleness of the prong material must be such as not to damage a planted seedling by the finger carrying the prong being swept over the top of the seedling, but also have sufficient firmness to retain the seedling between the fingers while it is being conveyed from the position where loaded to the furrow where it is deposited. Tubular prongs of differing characteristics may be readily interchanged by the tubular ends being slipped over the truncated end of the fixed position mechanical fingers of the implement.

DESCRIPTION OF THE INVENTION

Figure 1:
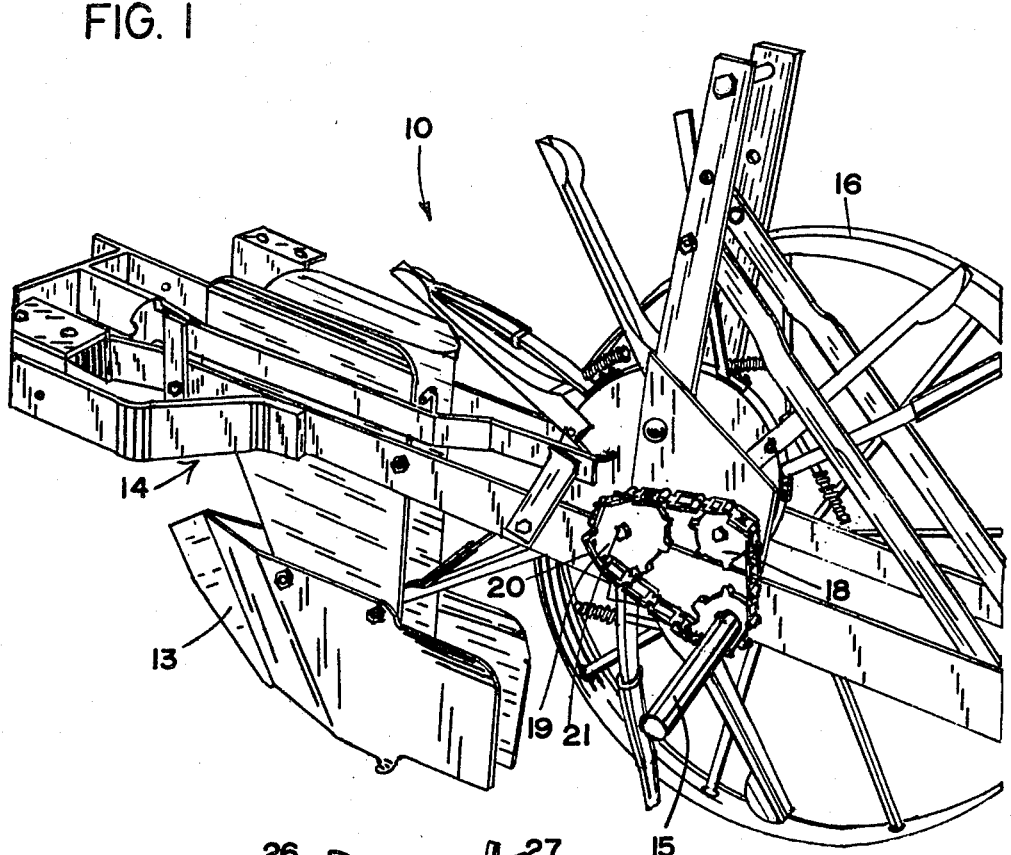
FIG. 1 is a perspective view of a poriton of a mechanical transplanter implement of this invention.
Figure 2:
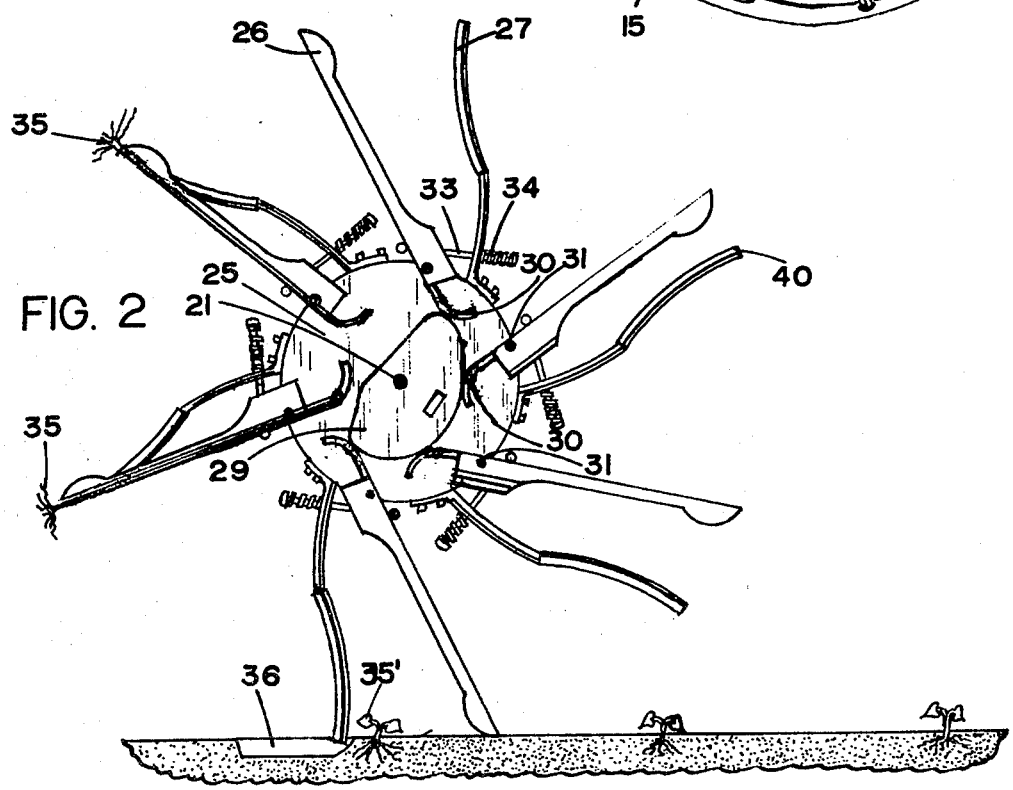
FIG. 2 is an elevation of a poriton of the embodiment of FIG. 1.

In FIGS. 1 and 2 transplanting machine 10 is shown as an implement adapted to be coupled to a farm tractor either by being furnished wth a three point hitch bracket or equivalent means or by being furnished with tongue and hitch, and implement wheels for being drawn by connection to a tractor drawbar. Longitudinally extending chassis 14 is shown supporting depending plow-like furrow opener 13 and stub axle 15 disposed rearwardly. Stub axle 15 is one of a pair, the other being concealed from view on the side of chassis 14 opposite from that shown. Pack wheel 16 is mounted by bearing means on the concealed stub axle and a similar left side pack wheel, not shown for sake of clarity of portrayal, is disposed on stub axle 15, the stub axles being set to provide divergent upward camber to the pack wheels with wheels being spaced only a few inches apart at ground surface.

The pack wheels together operate to close a furrow opened by furrow opener 13 with dirt being filled in around the roots of a planted seedling. Drive sprocket 17 is fixedly mounted to the left pack wheel, not shown, while a similar sprocket may be provided on pack wheel 16. Idler sprocket 18 embodies a quick change mounting and is supported on chassis 14, and similarly, driven sprocket 19 is mounted to enable it to be readily changed. The right side of implement 10 may be similarly equipped.

Link chain 20 meshes with sprockets 17, 18, and 19 causing them to be driven by turning of the pack wheels as they are pulled over ground surface. Shaft 21 is fixed to hub 25 at one end and releasably carries sprocket 19 at the other end. A counterpart may be provided on the opposite, right facing side of hub 25, however, hub 25 will be operably driven by linkage connection to one pack wheel only. Hub 25 is driven to rotate counterclockwise in the view shown directly above a furrow opened by furrow opener 13 and in the plane of the furrow.

Six pairs of mechanical fingers are shown mounted on hub 25 with fingers 26 being fixedly mounted on the hub and fingers 27 pivotally mounted on the hub with individual fingers of each pair being connected by rods 33, and spring loaded by compression springs 34 to urge the fingers of each pair to close together. The inner ends of pivotally mounted fingers 27 are arcuately configured to provide cam followers 30. Cam lobe 29 is fixedly mounted on chassis 14 for being operably contacted by cam followers 30. Any number of finger pairs may be mounted on hub 25 as desired.

To provide greater or lesser spacing between seedling in a row being planted, sprockets 17 and 19 may be interchanged with sprockets of different size with the restriction heretofore necessary, however, that fingers 26 could not be caused to sweep backward above the furrow and shear off a freshly planted seedling, but rather that the tip of finger 26 must lift from bottom dead center position by traveling in a path not rearward of vertical. The description hereinabove as concerns a transplanting machine with mechanically rigid fingers 26 comprises no part of this invention and is a disclosure of prior art apparatus.

Some seedling transplants may advantageously been closely spaced. For example, strawberry transplantings may be spaced as closely as two inches to enable a crop to be harvested in the season that the planting is made rather than for a first harvest, in the following season, the entire first season being normally required for root development when greater plant spacing is employed at the expense of berry development during the initial planting season.

The use of transplanting machine 10 for setting strawberry plants at close spacing is not feasible with a machine equipped with mechanically rigid fingers 26 because of damage caused to the plantings by the fingers 26 forcibly sweeping across the fresh transplants with unyielding mechanical rigidity. However, machine 10 when equipped with yieldable rubber-like tip members 40 as shown in FIGS. 1 and 2 may be used to plant strawberry seedlings at very close spacings with virtually one hundred percent survival of the seedlings. A preferred material for tip member 40 is a length of rubber tubing sufficiently long to clear the top of a seedling transplanted when finger 26 sweeps over the planting and sufficiently firm to insure secure retention of the seedling in the grasp of a finger pair while it is being conveyed mechanically for transplanting. For the tenderest of seedlings, a length of bicycle innertube may be used for tip member 40 and for more sturdy seedlings a length of garden hose may be employed. Selection of a particular material for use as tip 40 is best made by trial and error is a sample test. Tubular material is not required for tip member 40, but is convenient because such material may be frictionally slipped on and off the truncated metal finger 26 stub end and thus be readily changed as necessary for use with a variety of seedling types and sizes. Any operable fastening means other than frictional retention of tip member 40 on finger 26 may be employed.

Employment of yieldable tip member 40 on fingers 26 enables machine 10 to be operably used to transplant virtually any seedling whatever, and provides universality of use to a machine which otherwise is limited to spacing seedling transplants no closer than permitted by a constraint that tip paths of fingers 26 define cusps.

I claim:

1. In a transplanting machine of a type embodying pairs of mechanical fingers mounted on a hub to radially extend and be carried in a vertical plane by rotation of the hub, one finger of each pair being fixedly mounted and the other being pivotally mounted on said hub and driven by cam actuation to open and close with respect to the fixed finger for alternatingly holding and releasing plants to be planted, an improvement comprising the tipmost portion of said fixedly mounted mechanical finger bearing an extension of rubber-like yieldable material extending beyond said portion whereby said extension will flex and yield sufficiently while being drawn across the top of a transplant so as not to inflict damage to such transplant and thereby enable transplants to be planted at closer spacing than would be possible by a fixed mounting finger being caused not to traverse across the top of a transplant.

2. The apparatus of claim 1 wherein said tip extremity portion is tubularly configured for being frictionally retained on a rigid portion of said fixedly mounted finger.

* * * * *